Figure 1:
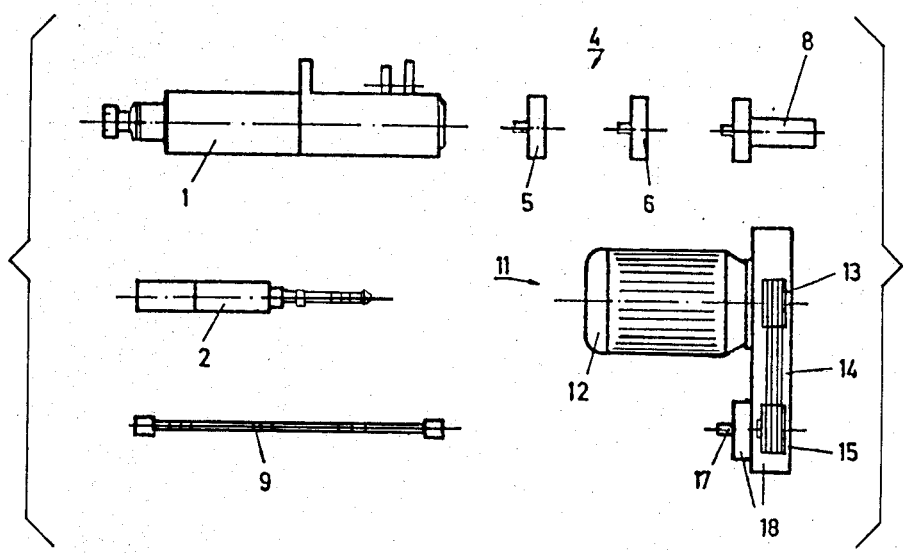

United States Patent [19]

Fumey

[11] Patent Number: 4,701,082
[45] Date of Patent: Oct. 20, 1987

[54] MULTIPURPOSE MACHINING UNIT

[75] Inventor: Jurg Fumey, Kirchdorf, Switzerland

[73] Assignee: Suhner Intertrade AG, Brugg, Switzerland

[21] Appl. No.: 782,151

[22] PCT Filed: Jul. 25, 1983

[86] PCT No.: PCT/CH83/00090
§ 371 Date: Mar. 21, 1984
§ 102(e) Date: Mar. 21, 1984

[87] PCT Pub. No.: WO84/00512
PCT Pub. Date: Feb. 16, 1984

Related U.S. Application Data

[63] Continuation of Ser. No. 598,288, Mar. 21, 1984, abandoned.

[30] Foreign Application Priority Data

Aug. 4, 1982 [CH] Switzerland .......................... 4687/82

[51] Int. Cl.⁴ ............................................. B23B 47/14
[52] U.S. Cl. ..................................... 408/127; 74/661; 408/48; 408/133
[58] Field of Search ............................. 408/130, 127

[56] References Cited

U.S. PATENT DOCUMENTS

| | | | |
|---|---|---|---|
| 1,858,995 | 5/1932 | Klausmeyer | 408/133 |
| 3,213,711 | 10/1965 | Kieboom | 74/661 X |
| 3,617,143 | 11/1971 | McKee | 408/127 |
| 3,709,059 | 1/1973 | Elsel | 74/661 |
| 3,724,561 | 4/1973 | Merrels | 173/50 |
| 3,894,809 | 7/1975 | Hollins | 74/661 |
| 4,105,361 | 8/1978 | Petroff | 408/130 |
| 4,315,439 | 2/1982 | Grachtrup | 74/661 |
| 4,371,297 | 2/1983 | Hirose | 408/130 |

FOREIGN PATENT DOCUMENTS

| | | | |
|---|---|---|---|
| 880069 | 6/1953 | Fed. Rep. of Germany | 408/48 |
| 776144 | 6/1957 | United Kingdom | 29/26 A |

OTHER PUBLICATIONS

Westinghous Engineering, 1959, "A Versatile System of Gears", pp. 108–111.

Primary Examiner—Gil Weidenfeld
Assistant Examiner—Glenn Webb

[57] ABSTRACT

In a multipurpose machining unit with pneumatic spindle feed, driving is performed, starting from a motor unit (12), directly or via a flexible shaft (9). An interchangeable gear set (4) makes it possible to select the number of revolutions of the tool in accordance with its purpose. In this connection, for simultaneous use, an arbitrary number of gears (5, 6) is provided. The gears (5, 6) of the gear set (4) can be plugged together in coaxial series. The driven side of the motor unit (11) can be plugged together with the machining unit directly or by way of at least one gear (5, 6) or by way of a connecting coupling (8) for a flexible shaft (9) into a rotational connection. With the use of such a machining unit, individual spindles can likewise be operated economically.

2 Claims, 7 Drawing Figures

MULTIPURPOSE MACHINING UNIT

This is a continuation of application Ser. No. 598,288, Filed Mar. 21, 1984, now abandoned.

The present invention relates to a multipurpose machining unit with pneumatic spindle feed driven by a motor unit directly or by way of a flexible shaft.

STATE OF THE ART

Boring spindle feeds are devices known in the machine, furniture, and wood industries and are utilized for the operations set out below:
- boring
- threading
- reaming
- internal turning
- milling (optional).

Boring spindle feeds are driven by means of the following types of drive units designed for rotation and translation.
(1) Electric motor/pneumatic feed
(2) Pneumatic motor/pneumatic feed
(3) Flexible shaft/pneumatic feed
(4) Electric motor/hydraulic feed.

The types of drive units (1)-(3) are usable for identical purposes, that is, they can be interchanged. The type of drive unit (4) is employed primarily for large-scale and heavy machining.

The advantages and drawbacks of the various kinds of drive units can be summarized approximately as follows:

Electric motor/pneumatic feed is the most widespread kind of drive mechanism. The structural size of the unit is principally determined by the electric motor; the individual units are relatively heavy. The feeding power is limited by the piston area of the pneumatic cylinder.

The combination of pneumatic motor/pneumatic feed permits compact modesl. Arrangements are also known comprising directly constructed individual release devices. However, the high energy costs for the rotational operation by way of pneumatic rotating-piston engine, for example, have rendered this version increasingly less interesting in view of energy conservation considerations.

The lathe with a flexible shaft and pneumatic feed permits the production of spindles of a compact size. Arrangements are known driving up to eight boring feed spindles by means of a central drive motor. Such a lathe is too expensive for installations of up to three spindles since the expense for the drive mechanism is distributed among too low a number of spindles. Otherwise this configuration is an economical system.

DESCRIPTION OF THE INVENTION

The present invention has the object of providing a possible solution for the construction of machining units of such a type wherein even individual spindles can be operated economically.

The multipurpose machining unit according to this invention is characterized by an interchangeable set of gears, any desired number of gears being provided for simultaneous use.

In this connection, it is possible, for simultaneous use, to arrange for no gear at all, one gear, or several gears, as well as either a connecting coupling for accommodating the flexible shaft, or a motor unit.

It is therefor an object of the invention to provide a new and improved multipurpose machining unit.

It is another object of the invention to provide a multipurpose machining unit with pneumatic spindle feed driven by a motor unit directly or by way of a flexible shaft.

It is another object of the invention to provide a multipurpose machining unit which is economical for installations of less than three spindles.

These and other objects, features, and advantages of the present invention will become more apparent from the following description when taken in connection with the accompanying drawings which show, for the purposes of illustraiton only, one embodiment in accordance with the present invention.

Figure 2:
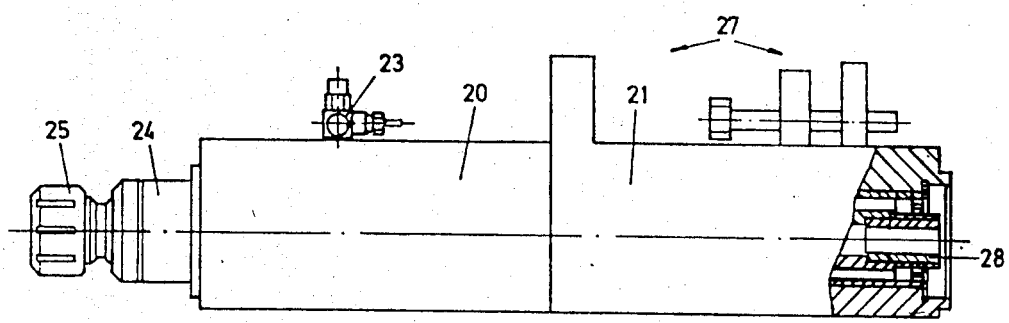
Figure 3:
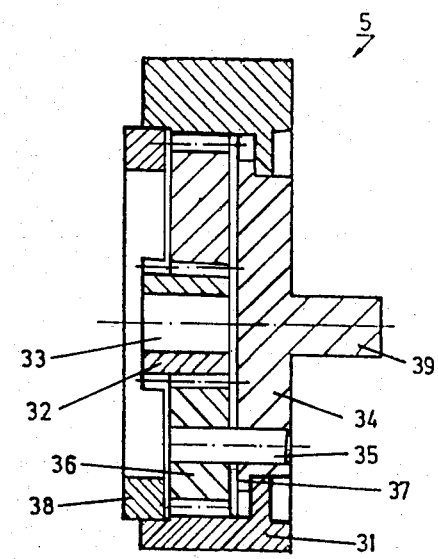
Figure 4:
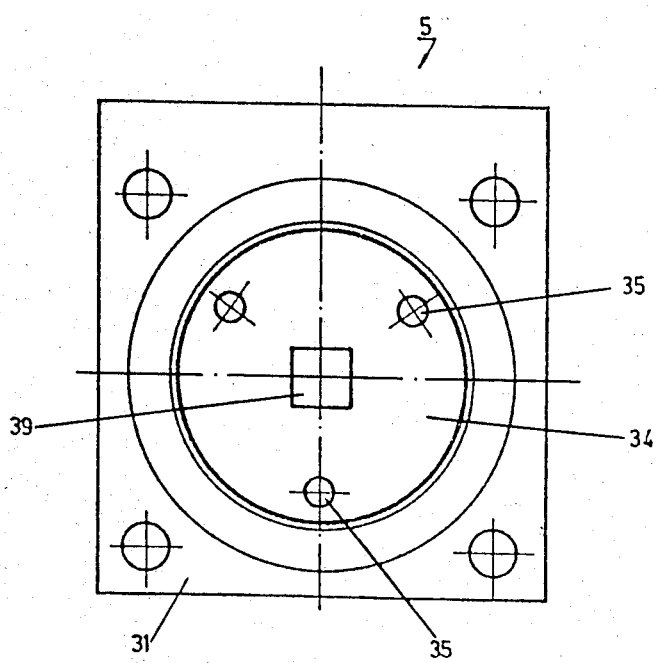
Figure 5:
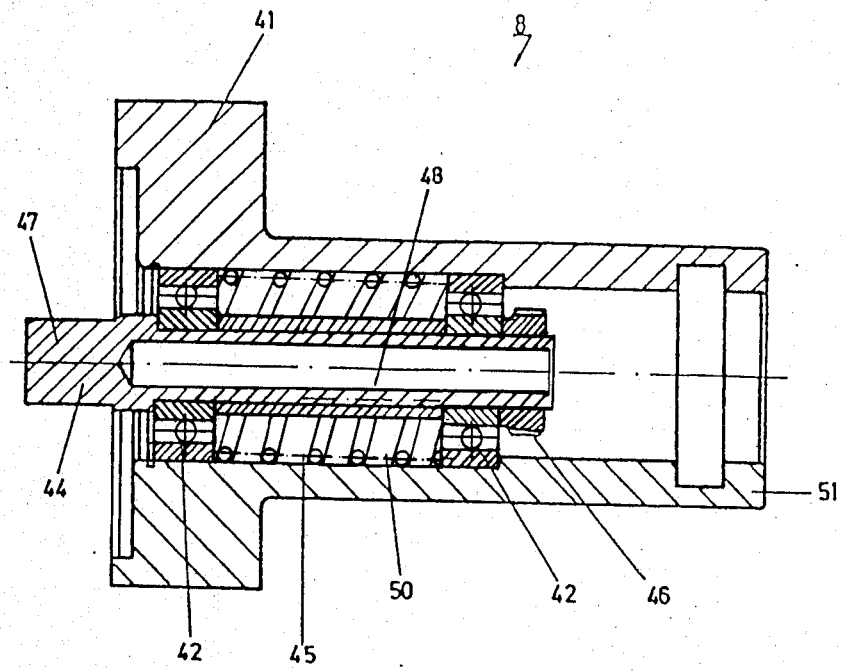
Figure 6:
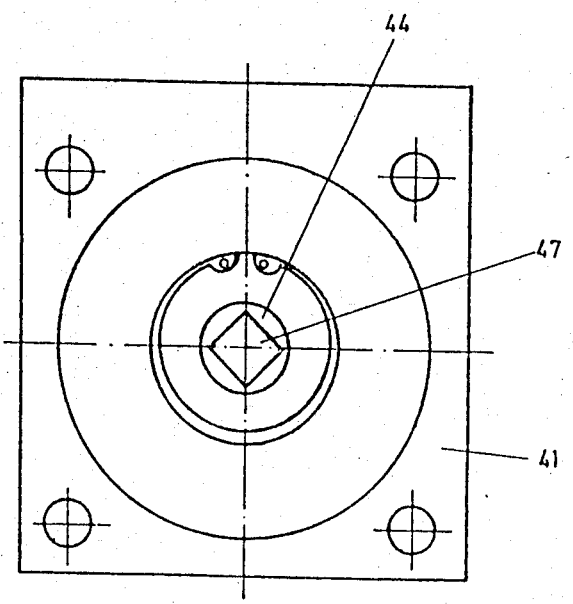
Figure 7:
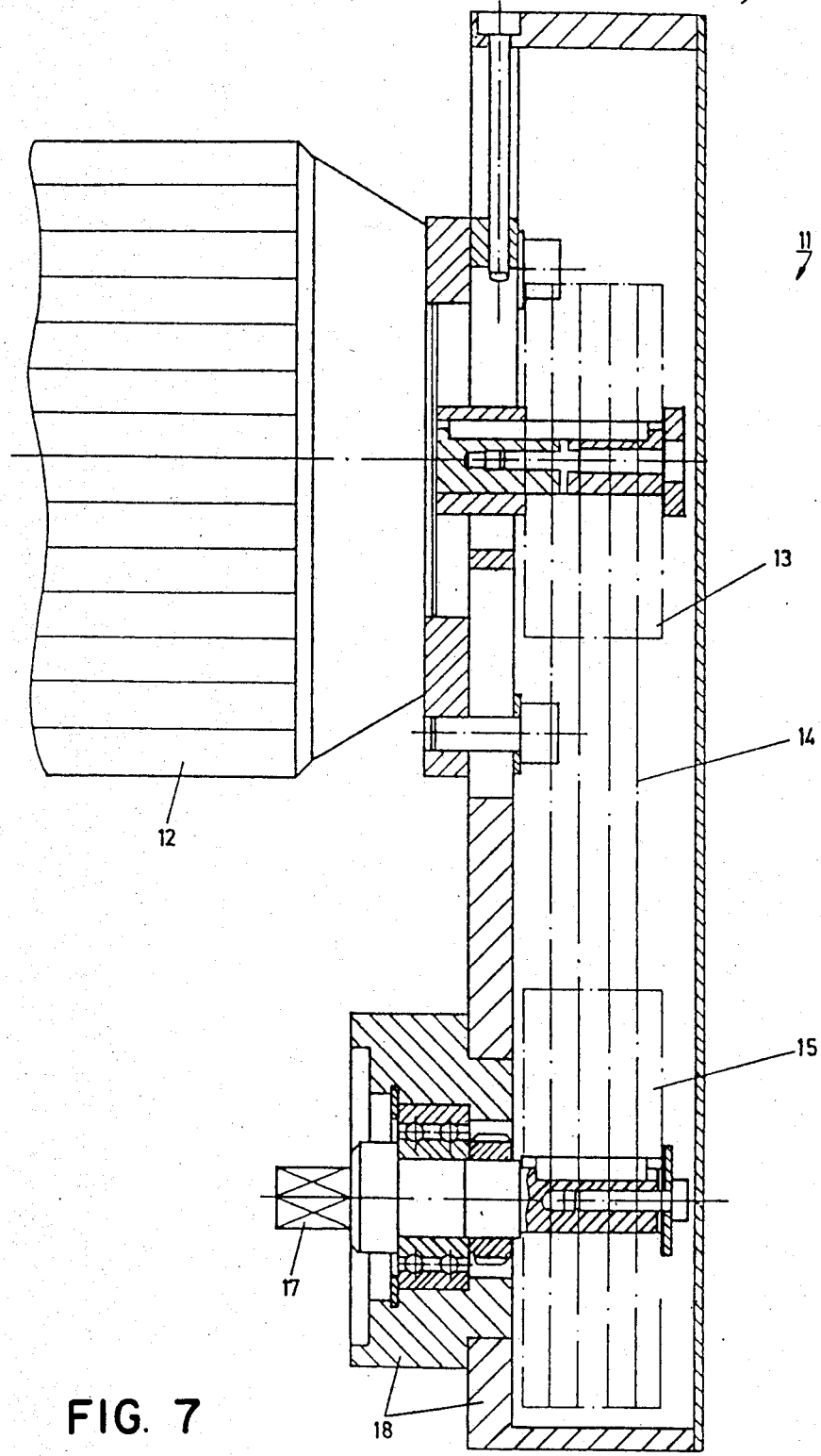

FIG. 1 shows, in a purely schematic view, the individually illustrated groups of a multipurpose machining unit, FIG. 2 is a lateral view of the machining unit according to FIG. 1, with the drive side being shown in sectional view, FIG. 3 shows a meridian section through a gear of the gear set, FIG. 4 shows a frontal view of the gear according to FIG. 3, FIG. 5 shows a meridian section through a connecting coupling of the arrangement according to FIG. 1, FIG. 6 shows a frontal view of the coupling of FIG. 5, FIG. 7 is a meridian section through the drive element according to FIG. 1.

DESCRIPTION OF THE INDIVIDUAL FIGURES

With reference to the drawings wherein like features are represented by like reference numerals, the multipurpose machining unit, illustrated in FIG. 1 separated into its structural groups, comprises a spindle body 1 on which a brake cylinder 2 is mounted, as well as a gear set 4 with the different gears 5 and 6 shown herein, these gears being followed by a connecting coupling 8 for accommodation of a flexible shaft 9. The machining unit is driven by a drive unit 11 with an electric unit 12, an exchangeable V-belt pulley 13 being seated on the shaft of the latter. This V-belt pulley drives, via a V-belt 14, an exhangeable pulley 15 seated on a slip-in stub shaft 17 in a housing 18.

It is basically possible in this arrangement to transmit the drive power directly, i.e. starting with the drive unit 11, by way of no gear at all, one gear, or several gears of the gear set 4 to the spindle body 1; or, alternatively, to arrange driving via the flexible shaft 9 and the connecting coupling 8. Modes of operation along the lines of the arrangements described in the introduction are basically conventional.

The spindle body 1 illustrated in FIG. 2 is known per se. The drawing shows a spindle housing 20 as well as a drive housing 21 connected therewith. Two pneumatic connections 23 are conventionally provided on the spindle housing 20. A sleeve 24 projects at the front from the spindle housing 20. Furthermore, a collet with chuck 25 is illustrated. An installation 27 for the mounting and operation of the oil-operated brake cylinder 2 is arranged on the drive housing 21, and an entrainment means 28 with a central square bore is located in the rear portion of the cylinder.

The gear 5 shown in FIGS. 3 and 4 is representative of a set of gears 4 containing several gears in order to obtain, by appropriate installation, the desired numbers of revolution, a large speed rate increment jump, for the tool to be clamped in the collet 25. Such a gear comprises a housing 31 with a central pinion 32 having a square bore 33. Furthermore, a planetary gear carrier 34 is provided; in the present case, three pins 35 are attached in this carrier, serving for the accommodation of respectively one planetary gear wheel 36. Spacer disks 37 take care of an appropriate spacing between planetary gear wheels 36 and planetary gear carrier 34. A centering ring 38 closes the housing 31 after installation of the gear wheels. The planetary gear carrier 34 is provided at its front face with a square stub 39 representing the coupling element.

FIGS. 5 and 6 shows a connecting coupling 8 with a clutch housing 41, as well as with a ball bearing 42 arranged in the central bore thereof, serving for the support of a drive shaft 44. The two ball bearings 42 are spaced apart by a sleeve 45. A locking nut 46 secures the position of the drive shaft 44. The latter is equiped on the end face of the housing 41 with a square stub 47 as the coupling element, the drive shaft 44 exhibiting a central bore 48 for receiving one end of the flexible shaft 9. Since such flexible shafts likewise pertain to the state of the art, they will not be explained in greater detail below. The power transmission via flexible shaft 9 and drive shaft 44 is effected by way of two needles 50 projecting into the interior of the bore 48 and thus serving as drivers. The internal diameter of the coupling neck 51 of the housing 41 serves as guide means for the flexible shaft 9.

FIG. 7 shows, on an enlarged scale, the drive unit 11 illustrated in FIG. 1, which basically likewise belongs to the state of the art.

The spindle body 1 is constructed so that it is usable without disassembly or refitting as a basis for the flexible shaft drive or the direct electric drive. The brake cylinder 2 can be integrated into the spindle body 1. The input speed is in this case equal to the output speed. No gear 5, 6 is installed in the machine.

The connecting coupling 8 for the flexible shaft 9 is centered at the spindle body 1 by way of a collar and is attached by means of screws. Power transmission takes place via a plug-in coupling fashioned as a square stub shaft 47. The connecting coupling 8 exhibits on the opposite side a connecting possibility for the flexible shaft 9 via a sliding clutch with the driving needles 50.

The structure of the drive unit 11 with the electric unit 12 and the gearbox in a closed arrangement, known per se, comprises the belt 14 (toothed, V, poly-V) and various pulleys 15 for staggered numbers of revolutions (small speed rate increment jump). The connection is designed so that it can be attached to the spindle body 1 instead of the connecting coupling 8. For stepwise reduction, large progressive speed ration, one or more fixedly interposable gears 5, 6 of the gear set 4 can be utilized. The drive unit 11 can be mounted offset by 90° with respect to the spindle body 1.

The gear 5, 6 is utilized for drive speed reduction (large progressive speed ratio). Low numbers of revolutions are required in case of thread-cutting and reaming operations. It is possible to mount several gears in series. Centering and attachment take place analogously to the connection of the flexible shaft. For financial reasons, a practicable staggering of gears is determined and, in some cases, two identical gears are mounted in series.

The advantages of this system are obvious: The range, nowadays uneconomical, by prior art disclosure of installations having spindle numbers (drive unit: flexible shaft/pneumatic feed) below four entities, has thus been successfully covered.

Commercial Utilization

A considerable reduction in parts is possible by the module system. With the aid of a few components, a large number of meaningful versions can be created. Storage at decentralized locations is reduced and simplified.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A multipurpose machining unit having a group of interrelated component parts capable of being assembled to transmit power from a power source having an interchangeable speed belt power transmission means, the group comprising the combination of:
   plural plug-in interchangeable gear set means each adapted to be connected to receive power from the interchangeable speed belt means,
   each plug-in interchangeable gear set means comprising input gear means having an axis of rotation and receiving power at a first rotational speed and disposed coaxially therewith an output gear means transmitting power at a second rotational speed different from said first rotational speed, and
   a pneumatic spindle feed means being adapted to be connected to receive power from at least one of the plug-in interchangeable gear means at a rotation speed different from the rotational speed of the interchangeable speed belt transmission means.

2. A system for a multipurpose machining unit in accordance with claim 1
   wherein the power source comprises a flexible shaft and wherein the gear set means comprises
   at least one gear set coupled to provide power to the spindle feed, and
   means for coupling to provide power from the flexible shaft to the input of the gear set.

* * * * *